United States Patent [19]
Lemelson et al.

[11] Patent Number: 5,823,788
[45] Date of Patent: Oct. 20, 1998

[54] INTERACTIVE EDUCATIONAL SYSTEM AND METHOD

[76] Inventors: Jerome H. Lemelson, 868 Tyner Way, Incline Village, Nev. 89450; Christian J. Grund, 880 Crescent Dr., Boulder, Colo. 80303

[21] Appl. No.: 556,611

[22] Filed: Nov. 13, 1995

[51] Int. Cl.[6] ................................................. G09B 3/00
[52] U.S. Cl. .................. 434/350; 434/323; 434/336; 434/351; 434/362; 379/102; 395/927; 273/432
[58] Field of Search ........................... 434/118, 156, 434/169, 307 R, 308, 322, 323, 327, 334–336, 350–352, 362, 365; 379/97, 102.53; 340/825.51, 825.5; 370/85.13, 85.14, 94.1, 34.3; 395/152, 154, 144, 159, 160, 927, 761, 326; 455/2, 3.1, 5.1; 364/419.19, 419.2; 273/429–432

[56] References Cited

U.S. PATENT DOCUMENTS

| | | | |
|---|---|---|---|
| 4,764,120 | 8/1988 | Griffin et al. | 434/350 X |
| 4,793,813 | 12/1988 | Bitzer et al. | 434/351 X |
| 4,876,592 | 10/1989 | Vonn Kohorn | 434/323 X |
| 5,002,491 | 3/1991 | Abrahamson et al. | 434/350 X |
| 5,176,520 | 1/1993 | Hamilton | 434/350 |
| 5,204,813 | 4/1993 | Samph et al. | 434/350 X |
| 5,261,823 | 11/1993 | Kurokawa | 434/323 |
| 5,263,869 | 11/1993 | Ziv-El | 434/350 X |
| 5,267,865 | 12/1993 | Lee et al. | 434/362 X |
| 5,273,437 | 12/1993 | Caldwell et al. | 434/350 X |
| 5,294,229 | 3/1994 | Hartzell et al. | 434/322 X |
| 5,302,132 | 4/1994 | Corder | 434/307 R X |
| 5,303,042 | 4/1994 | Lewis et al. | 434/307 R X |

*Primary Examiner*—Joe Cheng
*Attorney, Agent, or Firm*—Steven G. Lisa

[57] ABSTRACT

An interactive instructional system includes a microprocessor-controlled base station for use by an instructor and/or a computer and a plurality of input devices each for use by a student. The base station and input devices communicate over a communication link or network employing wires, optical fibers, radio links, infrared links or the like. Each input device is in the form of a multiple keyswitch operated device which the student may operate to respond to a question posed by the instructor, computer or base station during a lecture. Each input device is also provided with an identifier code. Responses by the student are transmitted to the base station in messages, each of which further includes an identifier code thereby identifying the answering device or student. The base station receives the students' responses from the input devices and generates information for display to the instructor, including selected class and individual statistics, the base station using the identifier code to associate each response to a student. The base station may provide the information to the instructor so that, during a lecture or course, instructional material and techniques can be adjusted based on the feedback information as to how well the class and individual students are learning the subject matter. Since this system can be used continuously during a lecture or course (instead of relying on tests only a few times during a course), the instructor can continuously tailor the course to the learning speed of the class.

41 Claims, 11 Drawing Sheets

Routine 355 (Continued)

INTERACTIVE EDUCATIONAL SYSTEM AND METHOD

FIELD OF THE INVENTION

The invention relates generally to the field of systems and methods for assisting in instruction in, for example, a classroom situation, and more particularly provides a relatively inexpensive, interactive instructional system that can enable questions to be posed to students and receive responses continuously during an instructional situation, and provide the instructor with statistics indicating the success of the instruction, so that the instructor can tailor the instructional presentation based on the statistics.

BACKGROUND OF THE INVENTION

A number of systems have been developed to assist instructors present instructional material in an instructional situation, and receive feedback which may provide information as to how well the students are learning the material. Generally, such systems have not been widely used, at least in part because of their high costs, often including costs related to the substantial modifications that are required to adapt existing class-room space to the systems, and limited flexibility and functionality.

SUMMARY OF THE INVENTION

The invention provides a new and improved interactive instructional system and method which is relatively low in cost, flexible and provides a substantial degree of functionality for the instructor. Generally, the system in one embodiment employs one or more computers to analyze indicia input by all students, by a selected subset of the students or by an individual student, which may be, for example, provided by the student in response to queries posed thereto by the instructor directly or by the system.

In brief summary, the invention is directed to a system and method for use in, for example, a classroom, to assist learning in a school situation, including an instructor and one or more students in a class. The instructor is provided with a computer- or microprocessor-controlled base station, and each student is provided with an electronic communicator as an input device which is linked to the base computer by a communication network or link such as one employing one or more wires, optical fibers, radio links, infrared links, LANs (local area networks), WANs (wide area networks) or the like. The student's communicator is in the form of a multiple keyswitch operated device including keys with which the student provide response indicia, such as "true" or "false" to a corresponding true/false, or the identification of one of a number of answers to a corresponding multiple choice question, or an extended or essay answer in response to an essay question, which may be posed by the instructor orally or the base station audibly through a speaker or visually over a display. Each communicator is also provided with an identifier code. A response by the student is transmitted to the base station along with an identifier code which identifies the student (or the input device, which, in turn, permits identification of the student) thereby identifying the student and his or her answer.

The base station receives the students' responses from the input devices and generates various outputs for display to the instructor, including but not limited to, such information as (a) one or more individual student's answer(s) to each question or selected questions; (b) any student's cumulative scores or ratings for responses to all or selected ones of the questions; (c) one or more student's responses to multiple choice questions; (d) statistics as to correct/incorrect answers to questions by student or class; (e) computed statistics regarding understanding or learning factors per subject(s) or point(s) raised or taught at any select point or time during a lecture; and (f) comparative statistics with other groups or classes and/or with respect to expected learning criteria. The base station may display the information to the instructor so that he or she can determine, during a lecture or course, how well the class and individual students are learning the subject matter, and adjust his or her instructional techniques based on the feedback. Since this system can be used continuously during a lecture or course (instead of relying on tests only a few times during a course), the instructor can continuously tailor the course to the learning speed of the class, or individual students or groups of students.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
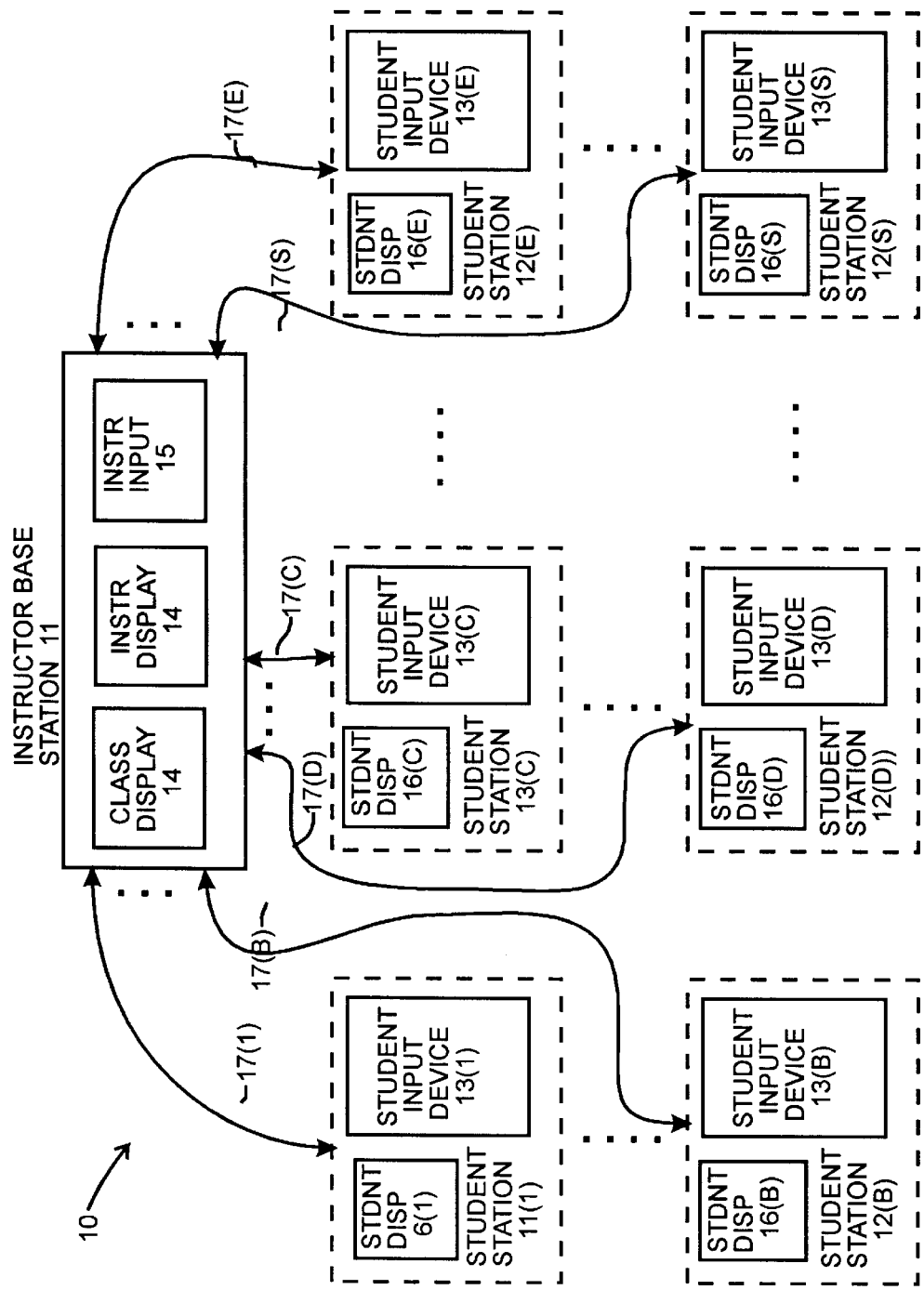
FIG. 1 is a functional block diagram of an interactive educational system constructed in accordance with the invention, the interactive educational system including an instructor base station to be used by an instructor and a plurality of student stations each to be used by a student.

FIG. 1 is a functional block diagram of an interactive educational system 10 constructed in accordance with the invention. The interactive educational system 10 includes an instructor base station 11, which is used by an instructor (which may include a human instructor and/or a teaching computer) in an instructional situation, and a plurality of student stations 12(*l*) through 12(S) (generally identified by reference numeral 12(*s*)) each of which is to be used by a student. The instructor base station 11 and the student stations 12(*s*) may be located in a common classroom in which the instructor instructs all of the students. Alternatively, some or all of the student stations, as well as the students, may be located in other rooms or buildings than the instructor and instructor base station. The instructor, in an instructional situation during, for example, a lecture, may present questions to the students, who can respond through student input devices 13(*l*) through 13(S) (generally identified by reference numeral 13(*s*)) each of which is associated with a student station 12(*s*). The students provide responses to the student input devices 13(*s*), which, in turn, generate response indicia for transmission to the instructor base station 11. The instructor base station, in turn, collects and records the responses and determines whether they are correct or not, and may display information, which may include information such as the number and percentage of correct and incorrect responses, particular students who provided incorrect responses and the like, on an instructor's display 44. The instructor may, periodically during an instructional session, make reference to the information displayed by the instructor base station's display 44 to determine how well the students are comprehending the instructional subject matter and, if necessary, modify and adapt the instruction based on the responses. In addition, the instructor may use the information provided by the instructor base station 11 to identify particular students who may need individual attention. The base station 11 can provide information to the instructor on an on-going basis (continually or when enabled by the instructor) during an instructional session, and so the instructor can adapt the instructional material on an on-going basis.

As described above, the instructor's base station 11 includes a display 44 for displaying the information generated by the base station 11 to the instructor. In addition, the base station 11 may include a display 14 for displaying information selected by the instructor to the class. The base station further includes one or more instructor information input devices, such as a keyboard, a mouse, a speech-recognition system, and the like, as well as a remote input device similar to the students' input devices 13(s), by which the instructor can input information to control the base station 11, identify particular curricula for the instructional session, identify questions and/or correct responses (which may include questions and/or responses that were previously provided to and stored by the computer as well as questions and/or responses newly posed or provided by the instructor during the instructional session), and the like. At least some of the student's stations 12(s) may include, in addition to the student input device 13(s), a video display 16(s) for displaying instructional information provided by the base station 11, which may include questions to be responded to, supplementary instructional material and the like. The information displayed on the video displays 16(s) may comprise textual information, graphics (including photographic information), video and animation information and the like.

The student stations 12(s) are connected to the base station 11 by respective communication links 17(s), which may comprise hard-wired connections such as electrical wires or optical fibers, radio or infrared links, and the like. The communication links 17(s) transmit the response indicia provided by the student from the respective student input devices 13(s) to the base station 11 for processing by the base station. In addition, the communication links 17(s) may transmit the questions and supplementary instructional material provided by the base station to the student stations 12(s) for display by their respective student displays 16(s). It will be appreciated that the base station 11 may provide the full text, graphics and video information for some or all of the questions and supplementary instructional material to the student stations 12(s) at, for example, the times they are to be displayed; in addition, the base station 11 may transmit identifying indicia which identifies text, graphics and video information for questions and supplementary instructional material which the base station 11 or other means (not shown) has previously provided to the student stations 12(s) for storage. The information transferred by the communication links 17(s) from the base station 11 to the student stations 12(s) may be essentially broadcast to all of the student stations 12(s), so that all of the student stations 12(s) substantially simultaneously receive the same information. Alternatively, the base station 11 may transmit information to the student stations 12(s) selectively, so that one or selected ones of the student stations 12(s) receive certain questions and supplementary instructional information, and others of the student stations 12(s) receive other questions and supplementary instructional information. Each student station 12(s), when transmitting response indicia to the base station 11, transmit both the response indicia as provided by the student, and a station identifier which identifies the student station 12(s), which, in turn, can be used to identify the student occupying the station 12(s). (It will be appreciated that the student stations 12(s) in system 10 will each have a unique station identifier to allow the base station 11 to identify, for each response indicia, the student station 12(s) which provided the response.) By transmitting both the station identifier as well as the student's response to the base station 11, the base station 11 can generate response statistics not only for the class as a whole, but also for individual students in the class, so that base station 11 can provide information as to the individual student's progress in the class to the instructor.

Figure 2:
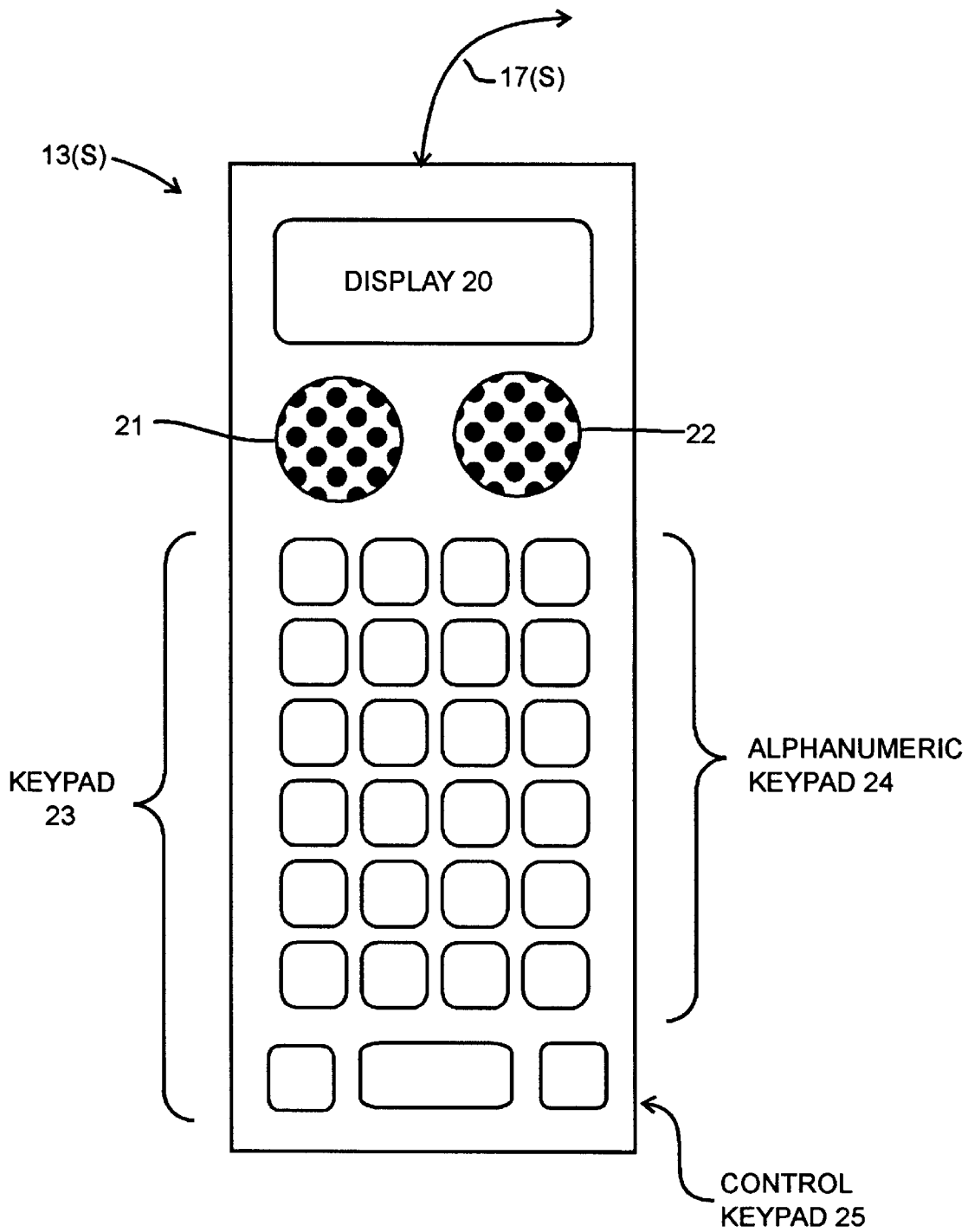
FIG. 2 is a functional block diagram of an instructor base station for use in the interactive educational system depicted in FIG. 1.

In addition to the student's input device 13(s), which will be described below in greater detail in connection with FIGS. 2 and 3, the student's stations 12(s) may further include other devices for enabling a student to input information or to other wise control his or her assigned station 12(s). For example, the student display 16(s) may provide an arrangement for inputting information, in particular by means of a touch-screen, light pen, stylus or other arrangement whereby a student may, for example, select one or more entries displayed on the screen. The student may, by means of a light pen or stylus, register a written (textual) answer, in, for example, essay form, by drawing the light pen or stylus over the display screen to effect printed or written textual characters or graphical indicia. (It will be appreciated that the students' stations 12(s) may in addition include a pad over which the light pen or stylus may be drawn, which the student may use instead of the display screen. In that case, the student may draw the light pen or stylus over the pad, and the student station 12(s) will display the drawn characters or graphical indicia.) The students' stations 12(s) may also include other conventional input devices, such as a mouse, trackball or other pointing device, for manipulating an on-screen pointer displayed on the screen of the student display 16(s).

Before proceeding further, it would be helpful to describe one embodiment of a student's input device 13(s) that is useful in connection with the system 10. FIG. 2 depicts a plan view of a student's input device 13(s) useful in one embodiment of the invention, and FIG. 3 depicts a functional block diagram of the student's input device 13(s). With reference to FIG. 2, the student's input device 13(s) is a device in generally elongated form dimensioned to be held in a person's hand. Toward an upper end of the device is a display 20, below which are a speaker 21 and a microphone 22, and toward the bottom a keypad 23. The display 20 (which may be the same component as the student station's display 16(s) or a separate component) may be a suitable display for displaying information in textual or graphical form, such as a CRT, liquid crystal, or plasma display.

As is conventional, the speaker 21 generates audible information which may be presented to the student by the base station 11. The audible information may include, for example, questions in audible form selected or provided by the instructor or the base station to be answered by the student. Depending on the particular question or other assignment, the student may respond through the microphone 22 and/or the keypad 23. If the microphone is used in this manner, the input device 13(s) or the base station 11 may be provided with voice recognition capabilities to generate text strings which correspond to the acoustic information input by the student. It will be appreciated that the use of the speaker 21 and microphone 22 to record a student's' responses in this manner may be particularly advantageous in, for example, language instruction, to enable the instructor to monitor the student's oral language progress.

The keypad 23 includes an alphabetic and/or numeric keypad 24 (hereinafter generally "alphanumeric keypad 24") and a control keypad 25. The alphanumeric keypad 24 includes keys which the student may depress to provide a response. As the student depresses successive keys of the alphanumeric keypad 24 to provide a response, the student's input device may provide a visual feedback to the student by displaying indicia representing the depressed key sequence on the display 20 or by generating audible feedback through the speaker 21. The control keypad 25 includes control keys which the student may use to control the student's input device 13(s). For example, the control keypad may include a control key (not separately identified) used to turn the student's input device 13(s) on and off. In addition, the control keypad may include a control key (also not separately identified) which the student may depress after entering his or her response to enable the student's input device to transmit the previously-entered response information over the communication links 17(s) to the instructor's base station 11. The control keypad 25 may also include control keys used control other functions of the student's input device 13(s), such as to turn the display 20 or the speaker 21 on and off.

The student's input device 13(s) may also include a connection (not shown) to which a conventional keyboard (also not shown) may be connected. A student may use a keyboard connected to the student's input device 13(s) to conveniently enter relatively lengthy responses to essay questions posed by the instructor. The student's input device 13(s) may operate in response to keystroke information received from the keyboard in a manner similar to the manner in which it responds to depression of keys on its keypad 24 as described above. The keyboard and connection thereto may be provided in addition to the keypad 24 of the student's input device 13(s), or it may substitute for some or all of the keypad 24.

Figure 3:
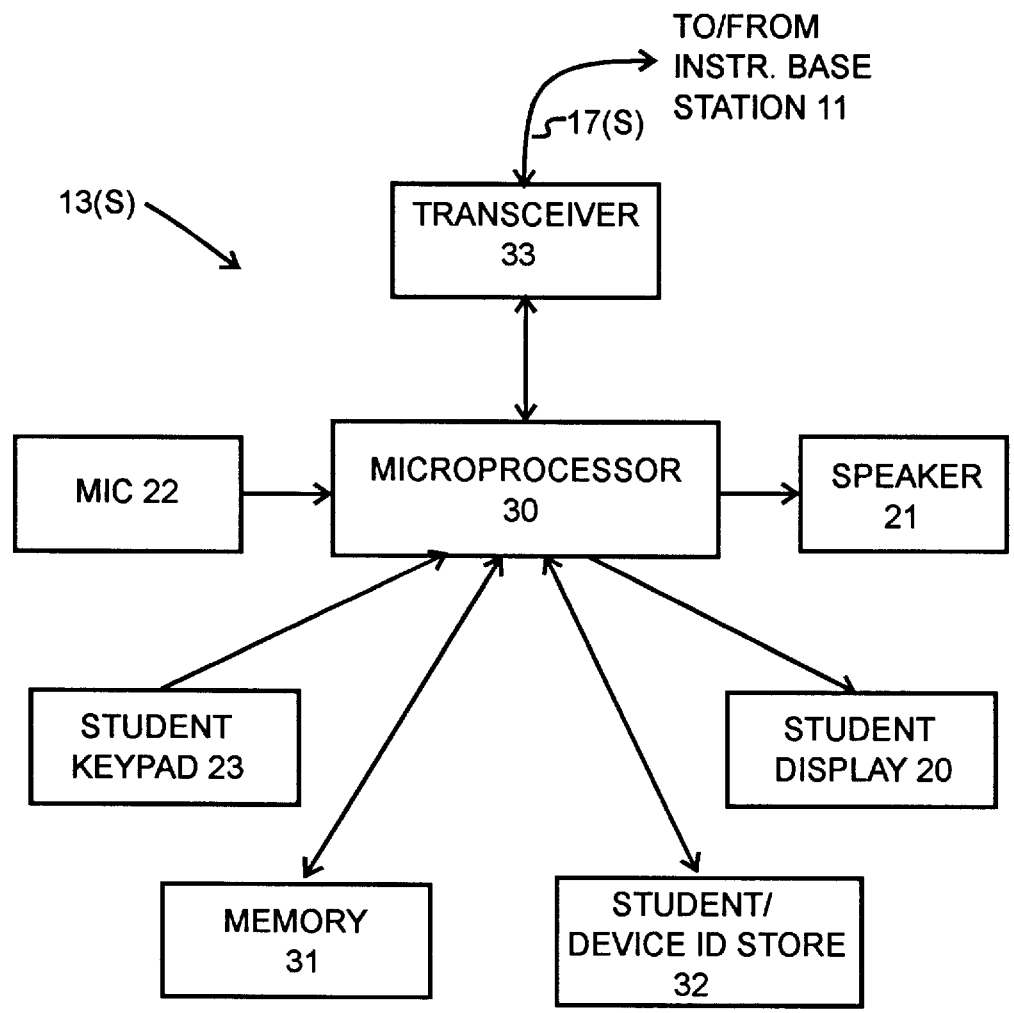
FIG. 3 is a functional block diagram of a student input device for use at a student station in the interactive educational system depicted in FIG. 1.

FIG. 3 depicts a functional block diagram of one embodiment of a student input device 13(s) useful in system 10. With reference to FIG. 3, the student's input device 13(s) includes, in addition to the display 20, speaker 21, microphone 22, and keypad 23, a computer or microprocessor 30 for controlling the operations of the student's input device 13(s), a program/data memory 31 [which may be in the form of read-only memory (ROM) and/or read/write random-access memory (RAM)], a student identifier memory 32, and a transceiver 33. The microprocessor controls the operations of the student's input device 13(s) in response to input provided by the student through the keypad 23 and microphone 22. The program/data memory 31 stores a program and provides additional storage space (such as RAM storage) for holding data to be used in connection with the program, such as storing student responses prior to transmission to the base station 11. The student identifier memory 32 (which preferably comprises ROM storage) stores an identifier code, which the memory 32 may provide to uniquely identify the student or the input device 13(s). After the student inputs a response or a series of responses and enables the input device 13(s) to transmit it to the base station 11, the microprocessor 30 transmits to the base station 11 both response indicia representative of the response (which may be the response itself and/or a code identifying the response) and the identifier code provided by the identifier memory 32, so that the base station 11 can associate the response indicia to the particular student (or to the input device 13(s), which, in turn, is assigned to the student) and thereby disambiguate response indicia provided by each student.

Figure 4:
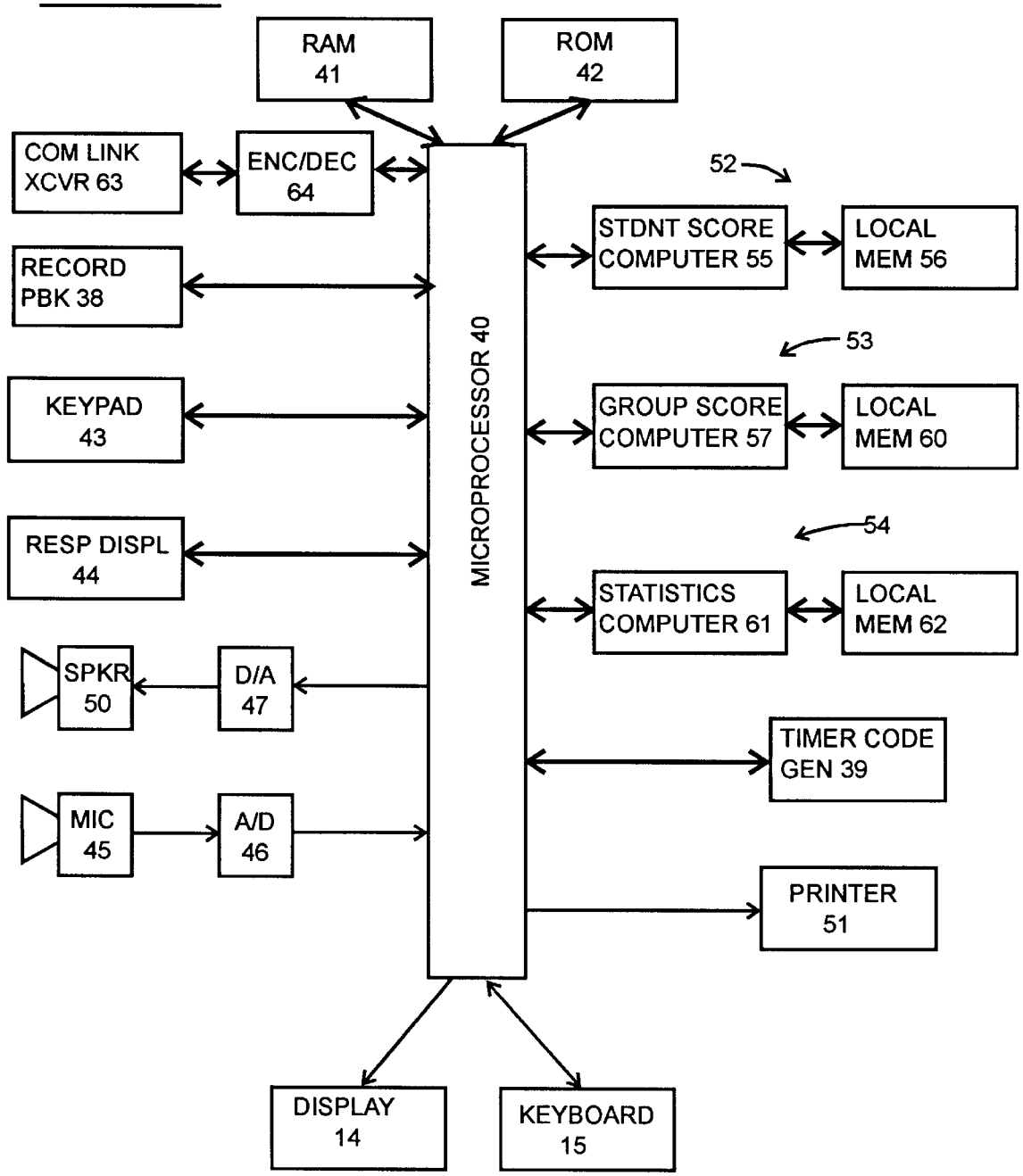
FIG. 4 depicts a plan view of the student input device used in student input device depicted in FIG. 3.

FIG. 4 is a functional block diagram of the instructor base station 11 for use in the interactive educational system depicted in FIG. 1. With reference to FIG. 4, the instructor base station includes a number of elements for transmitting information to individual ones of the students' input devices 13(s) and for receiving responses therefrom, and also for receiving class, question and other information from an instructor and providing scoring, statistical, and other information thereto in visual and audible form. In one embodiment, the instructor base station 11 is controlled by a microprocessor 40 which performs processing operations in accordance with program instructions and data stored in a random-access memory ("RAM") 41 and a read-only memory ("ROM") 42 and a clock generator 39. The microprocessor 40 receives instructor input through the keyboard 15 and an external keypad 43 on a hand-held input/output device 43, which operator input may include, for example, control input for controlling the base station 11 and instructional material, including queries, to be provided to the students during an instructional session and appropriate response information which the base station may use in determining correctness of responses provided by the students. In addition, the microprocessor 40 may provide visual output through the display 14 and a response display 44 on the hand-held input/output device and audible output through a digital to analog converter 47 and speaker 50. Further, the microprocessor 40 can, at the request of the instructor, provide hardcopy output control signals to a printer 51 to enable the printer to provide a hardcopy output. The base station 11 may also include a pre-recorded audio information playback device 38, such as a compact disk player, magnetic disk or cassette tape player or the like, for playing information from portions of a compact disk, magnetic disk or cassette tape or the like, as selected by the microprocessor 40. The audio information played by the pre-recorded information playback device 38 may be coupled through the digital to analog converter 47 and speaker 50 for broadcast to the instructor and/or the class.

The microprocessor 40 may also provide digital audio information, including speech, music or other auditory information which is to be provided to the instructor and/or the class, to the digital to analog converter 47. The digital to analog converter 47, receives the digital audio information from the microprocessor 40 and converts it to an electrical signal in analog form. The analog signal from the digital to analog converter 47 is provided to a speaker 50, which converts the signal to audio form for broadcast to the instructor and/or class.

In addition, the microprocessor 40 receives operational commands and other information in spoken form provided by the instructor through a microphone 45. In response to the spoken commands, the microphone 45 generates, an analog signal which is digitized by an analog to digital converter 46, which converts the analog signal to digital form for transfer to and processing by the microprocessor 40.

The base station 11 also includes several response score computer elements 52 through 54 for generating individual response information and class response statistics for the students in response to questions presented by the instructor. In particular, the base station 11 includes a student score generation element 52 including a student score computer 55 and a private memory 56 that stores individual responses from the students and for use by the student score computer in generating scoring information for the instructor. Similarly, a group score generation element includes a group score computer 57 and a private memory 60 which stores group scoring information from the entire instructional group for use by the group score computer in generating group scoring information for the instructor. A statistics generation element 54 includes a includes a statistics computer 61 and a private memory 62 that stores statistical information derived from responses and answers by the entire instructional group as well as other (and possibly prior) instructional groups for use by the group score computer in generating and providing scoring statistical information for the instructor. The scoring and statistical information generating elements 52 through 54 generate scoring and statistical information, such as:

(a) one or more student's answer, to each question or selected questions;

(b) any student's cumulative scores or ratings for responses to all or selected ones of the questions;

(c) one or more student's responses to multiple choice questions;

(d) statistics as to correct/incorrect answers to all or select questions by student or class;

(e) computed statistics regarding understanding or learning factors per subject(s) or point(s) raised or taught at any select point or time during a lecture; and (f) comparative statistics with other groups or classes and/or with respect to expected learning criteria, as well as other information which may be useful to and requested by an instructor in a known manner.

The base station 11 provides information, including questions for response, to the student input devices 13(s), and receive, responses from the student input devices 13(s) for processing, through a communication link transceiver 63. The microprocessor 40 provides information to be transmitted in digital form to an encoder/decoder 64, which converts the digital information to analog form for transmission by the communication link transceiver 63. In addition, the communication link transceiver 63 receives analog signals from the student input devices 13(s) and provides them to an encoder/decoder 64 which converts them to digital form for computational use by the microprocessor 40. It will be appreciated that each response from a student input device 13(s) will include student response information including responses provided by the students through, for example, their input device's keypads 23, and in addition respective identifier codes provided from the student identifier memory 32. By providing such identifier codes, the base station 11 determines the source of a response so that an instructor may determine which students are responding correctly or incorrectly.

It will be appreciated that a problem may develop in ensuring that the base station 11 receives responses from all of the student input devices 13(s), since a plurality of input devices may transmit signals for their responses and identifier codes at the same time. For example, the student input devices 13(s) may transmit on individual communication channels, and the transceiver 63 can include individual receivers for all of the channels. Alternatively, if it is desired that at least several student input devices transmit on the same communication channel, the base station's transceiver 63 may periodically transmit a polling signal, and the student input devices 13(s) may thereafter respond thereto and transmit the stored response and identifier code after a selected delay which varies among the input devices used in the classroom. For example, the student input devices may base their respective delays on the identifier codes in their student identifier memories 32; since the identifier codes will differ among all of the input devices 13(s), the respective delays will also differ. On the other hand, the base station 11 can poll the input devices 13(s) individually. Alternatively, each input device's transceiver 33, after transmitting its response, may monitor the transmission channel and, if another student input device is concurrently transmitting, retransmit sometime later (which may be a random delay time). In that case, it would be advantageous for the input devices 13(s) to provide error check information codes in the messages transmitted by the student input devices 13(s) to the base station so that the base station 11 will discard the transmitted information in the event of interference.

Figure 5:
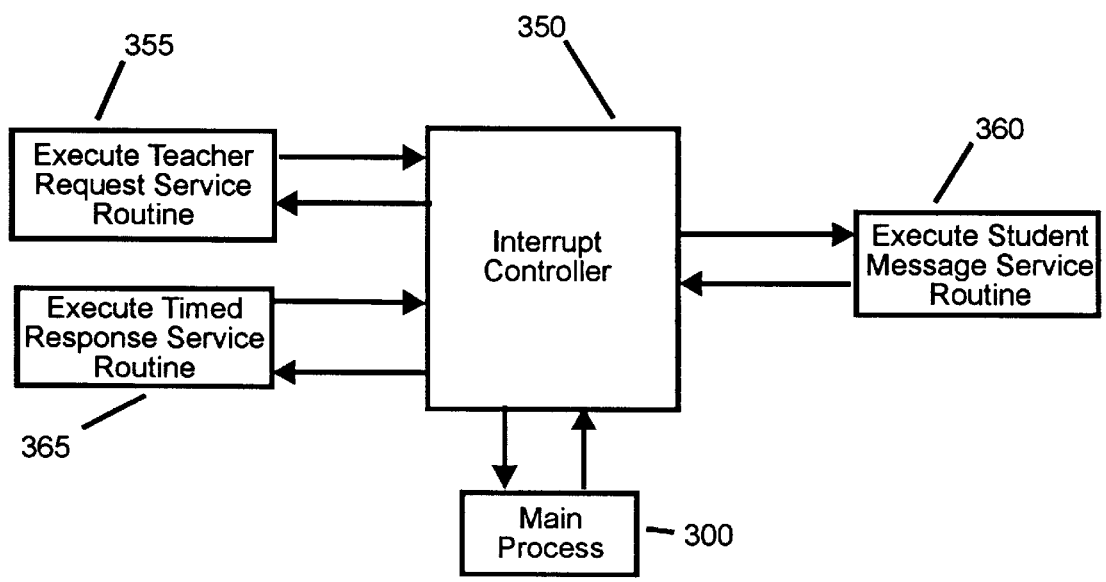
FIGS. 5 through 10 comprise flow diagrams depicting operations performed by microprocessors controlling the base station and input device in connection with the invention.

FIGS. 5 comprises a functional block diagram and FIGS. 6 through 10 comprise flow diagrams depicting the detailed operations performed by microprocessor 40 of the base station 11 under control of a program stored in the random-access memory 41 and read-only memory 42 (FIG. 4). Generally, the microprocessor 40 operates in connection with interrupts generated by the various input elements shown in FIG. 4. With reference initially to FIG. 5, a main process 300 is executed when the base station 11 is initially powered-up. The main process 300, generally, sets up the other software elements depicted in FIG. 5, including an execute instructor request service routine 355 (described below in more detail in connection with FIG. 8), an execute student message service routine 360 (described below in more detail in connection with FIG. 9), and an execute timed response service routine (described below in more detail in connection with FIG. 10).

Figure 6:
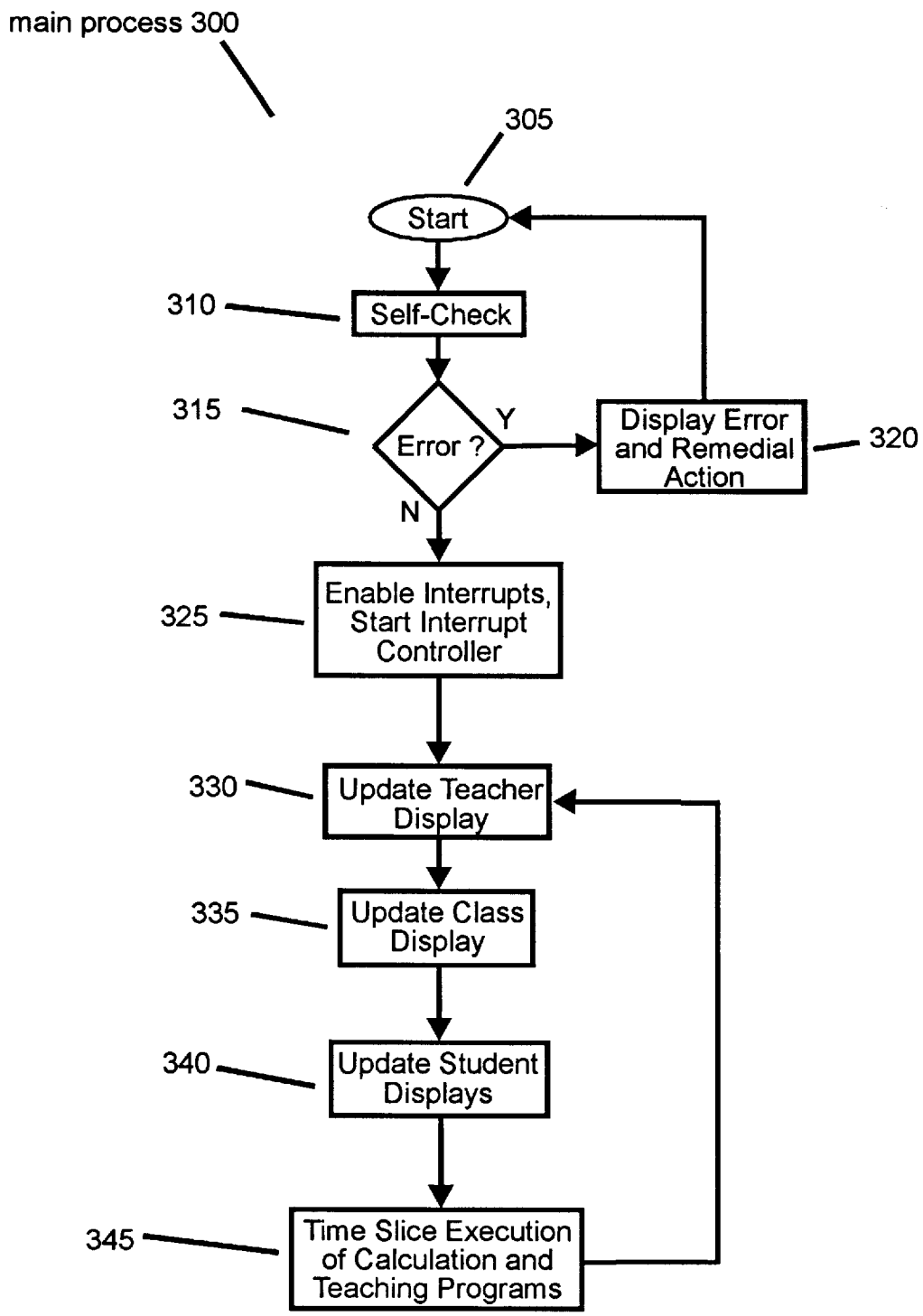

As indicated above, FIG. 6 depicts operations performed in connection with the main process 300. Operations begin at step 305 and proceed to step 310, where the microprocessor 40 initiates a system self-check to verify that the base station 11 and student's input devices 13(s) are operating properly. If a "significant" error is detected (step 315), the microprocessor 40 proceeds to step 320 where the microprocessor 40 controls the display 14 to display the detected error condition and suggested remedial actions. If the microprocessor 40 does not detect any errors at step 315, it sequences to step 325 where the interrupt controller 350 (FIG. 5) is established, after which device software and hardware interrupts may be enabled to facilitate real-time operation of the system 10.

Once microprocessor 40 has set the interrupts, it proceeds to an infinite loop starting at step 330, where the base station's hand-held display 44 is updated and refreshed to reflect all current display information required by the instructor. Thereafter, the microprocessor 40 proceeds to step 335 where the main class display 14, which is visible to all students, is updated and refreshed to display information as requested by the instructor. The microprocessor 40 then proceeds to step 340 where it operates to enable information to be transmitted to the students' individual stations, including information controlling operation of the students' individual displays as well as other devices such as audible or visual alarms and the like, to cause the displays to be updated and refreshed. Each student's display may display the same information, a selected subset or different information as required by the instructor or base station 11.

After refreshing the base station 11 and student stations 12(s), the microprocessor 40 proceeds to step 345 where it executes, preferably on a conventional time-slice basis, programs which are not time-critical for smooth or efficient operation of the system 10. Such programs may include the periodic presentation of selected information or questions to students; the collection of student responses in an automated fashion during, for example, a multi-question test or a multi-element lesson; the collection and calculation of statistical information; the execution of automated instructional programs; and the collection and interpretation of student emotional responses such as heart or respiration rate, EEG, EKG, or EMG, etc., if sensors therefor are provided at the students' stations 12(s). These operations may not be time-critical, since minor delays in acquiring or generating such information may not significantly negatively affect operation of system 10. The execution proceeds for a fixed or variable time slots consistent with smooth operation of system 10 and timely execution of the automated program, after which the microprocessor 40 saves the state of the program, and returns to step 330 with flow proceeding as previously indicated. The operations performed during steps 330 through 345 may be interrupted to execute an execute instructor request service routine 355, execute student message service routine 360 and the an execute timed response service routine as described below.

The microprocessor 40, while executing the main process 300, establishes the interrupt controller 350 in step 325, after which it enables device software and hardware interrupts to facilitate real-time operation of system 10. Operating the base station 11 in response to interrupts is advantageous in dealing with asynchronous inputs from the instructor and the student input devices 13(s), but it is noted that other methodologies, such as periodic polling, may be used instead. In connection with interrupt operation, when an instructor inputs information at the base station 11, an interrupt request is sent to controller 350 by the input device used by the instructor. The operations of the interrupt controller 350, in response, redirects the microprocessor 40 to execute the instructor message service routine 355 described in detail in FIG. 8. When a student's input device 13(s) provides information input by the student, an interrupt request is sent to controller 350 by the transceiver 63, in response to which the controller 350 redirects the microprocessor 40 to execute the student message service routine 360, described in detail in FIG. 9. On the other hand, when sensing circuitry such as a timer indicates the end or beginning of a question or response period, it sends an interrupt request, which is processed by the interrupt controller 350, which redirects the microprocessor 40 to execute the timed response service routine 365, described in detail in FIG. 9. When the interrupt service routines 355, 360, or 365 are completed, a return from interrupt is received by the interrupt controller 350, after which the microprocessor resumes its operations prior to receipt of the interrupt. Interrupt controllers are known in the art, and interrupt controller 350 provides several services, including redirection of program flow in response to receipt of an interrupt request, storage and restoration of the microprocessor's state at the beginning and end of interrupt service, arbitration among a number of concurrently-received interrupt requests, and time-outs if an interrupt routine requires an excessive amount of time.

Figure 7:
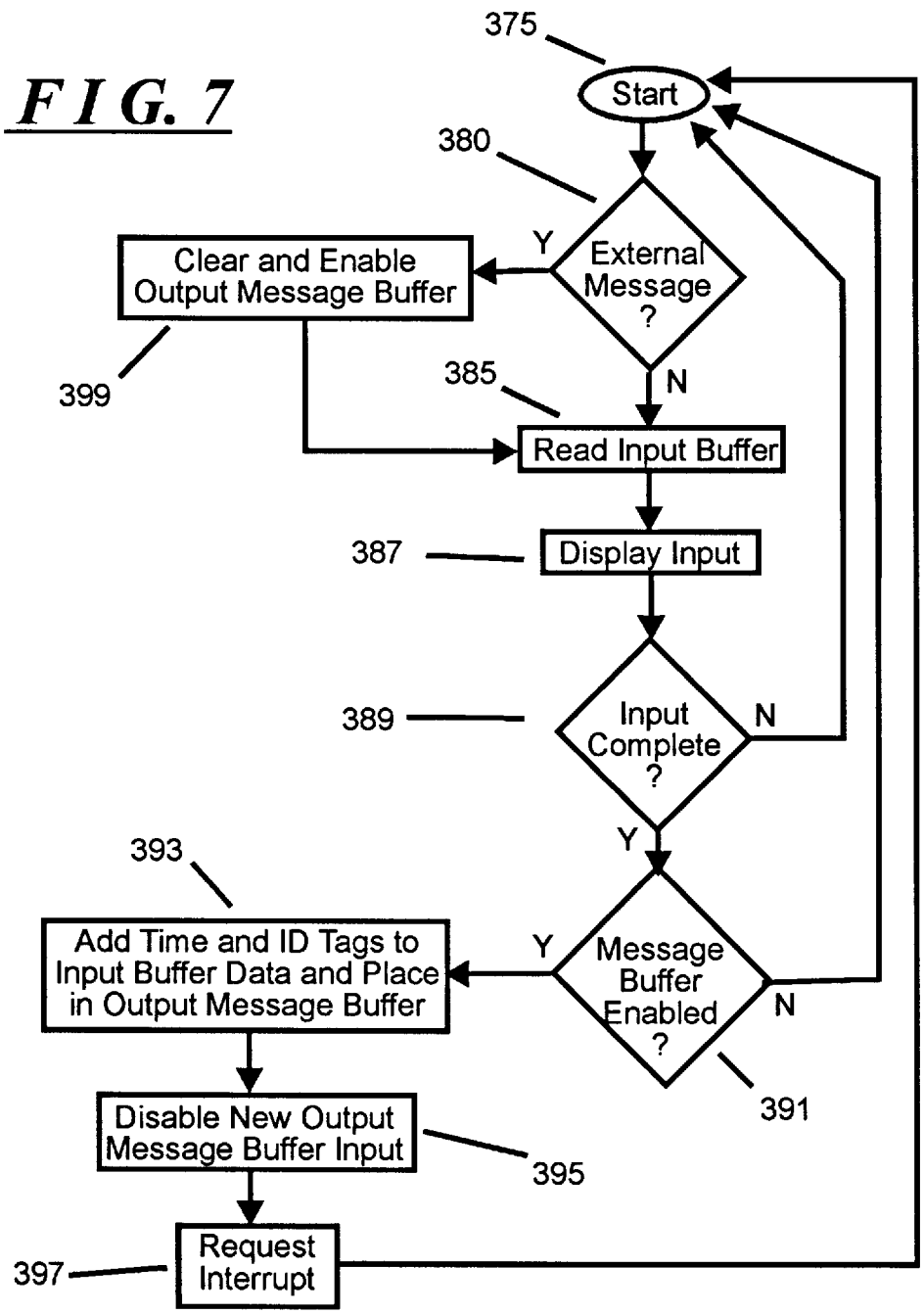

FIG. 7 shows operations performed by the microprocessor 30 in connection with operations involving the generation and transmission of messages by the students' input device 13(s) in connection with student input. If, as noted above, an instructor has an input device which is similar to a student's input device 13(s), the operations performed by the instructor's input device in connection with instructor input, will be similar to those shown in FIG. 7. Operations performed by the microprocessor 40 in connection with the processing of messages received from an instructor input device will be described in detail below in connection with FIG. 8, and operations performed in connection with a student's input device 13(s) will be described below in connection with FIG. 9.

Generally, student and instructor input to respective input devices will be in key-serial format (in the case of input from the keypad 23) or voice sample information received serially over a period of time (when generated as output by the microphone 22). To minimize the amount of communications required, the input device buffers the serial input in its transceiver 33 (FIG. 2) until input defining a complete message is received. When a complete message is received, the student or instructor will activate a transmit enable key (which may be a carriage return or one of the control keys 25) which enables the input device to transmit the message. After a complete message is received by the base station 11, the microprocessor 40 is interrupted to receive and process the message signals. By buffering messages in this manner, the microprocessor 40 of base station 11 need only be interrupted on a message basis, which may reduce the number of interrupts and minimize overhead required in communication operations performed by the microprocessor 40.

With reference to FIG. 7, in response to receipt of student or instructor input, the input device's microprocessor 30 to begin processing the input. As noted above, the input device includes a message buffer in its memory 31. Initially, the microprocessor 30 checks the above-referenced input buffer for an indication as to whether the base station has acknowledged receipt of the most recent message which the input device transmitted to the base station (step 380). The input device 13(s) records a copy of the most recent message in its output buffer until the base station 11 has correctly received the message and provides an indication that the message has been correctly received. If the base station did not correctly receive the message, it may provide an indication thereof to the input device, which retransmits the message. On the other hand, if the base station 11 did correctly receive a message, it will provide an appropriate indication to the input device 13(s), in response to which the input device may begin buffering a new message in the output buffer.

If there is no indication that a message has been received, the microprocessor 30 reads its input buffer (step 385). Information to be transmitted in a message may comprise a series of codes representing selected input from a keypad or keyboard as described above, or a sequence of digital values from a speech recognition processor in response to spoken input from the instructor or student through microphone 22. The microprocessor 40 then enables the information from the message received in the input buffer to be displayed by the input device's display 20 (step 387) to provide feedback to the student(s) (or instructor) of entered information and allow correction before it is transmitted. When an indication of completion of the operator input functions is received (step 389) for [e.g. a carriage return or special character typed on a keyboard, a selected word of speech recognized by the speech recognition computer, or a closure of a selected switch (not shown)].

The microprocessor 40 then determines whether the most recent input is an end-of-message (eom) indication, indicating the end of information input for a message. If the input is not an end-of-message indication, the microprocessor 40 returns its operation to step 375 to repeat the operations described above in connection with subsequent input. These operations will be repeated until the microprocessor 40 determines, in step 389, that student or instructor input is an end-of-message indication. If the microprocessor 40 determines in step 389 that the student or instructor input is an end-of-message indication, it sequences to step 391. In step 391, the microprocessor 40 checks an output message buffer enabled flag, which is (a) clear if the output buffer contains a previous message which has not been acknowledged by the base station 11 and (b) set if the output buffer does not contain a previous unacknowledged message. If the microprocessor 40 determines in step 391 that the output message buffer enabled flag is set (that is, it determines that the output buffer enabled flag indicates that the message buffer has a previous unacknowledged message), it returns to step 375 to repeat the operations described above.

On the other hand, if the microprocessor 40 determines in step 391 that the output message buffer enabled flag is clear, indicating that the message buffer does not contain a previous unacknowledged message, it loads the information into the output buffer and adds time and identifier codes obtained from the identifier store 32 (step 393) and sets the output message buffer enabled flag (step 395). Thereafter, the transceiver 33 can transmit the message to the base station, and the microprocessor 40 will return to step 375 to await new input.

On receiving the message, the base station's communication link transceiver 63 will request interrupt service by the base station's microprocessor 40, which is processed as described below in connection with FIGS. 8 and 9. When the interrupt request is recognized by the microprocessor 40, the microprocessor 40 will enable the base station 11 to send a message read code to the originating input device 13(s) This message read code is received by the microprocessor 40 of the originating input device in step 380, and the microprocessor 40 sequences to step 399 to set the output message buffer enabled flag so that the output buffer can be used for a new message as described above.

Figure 8:
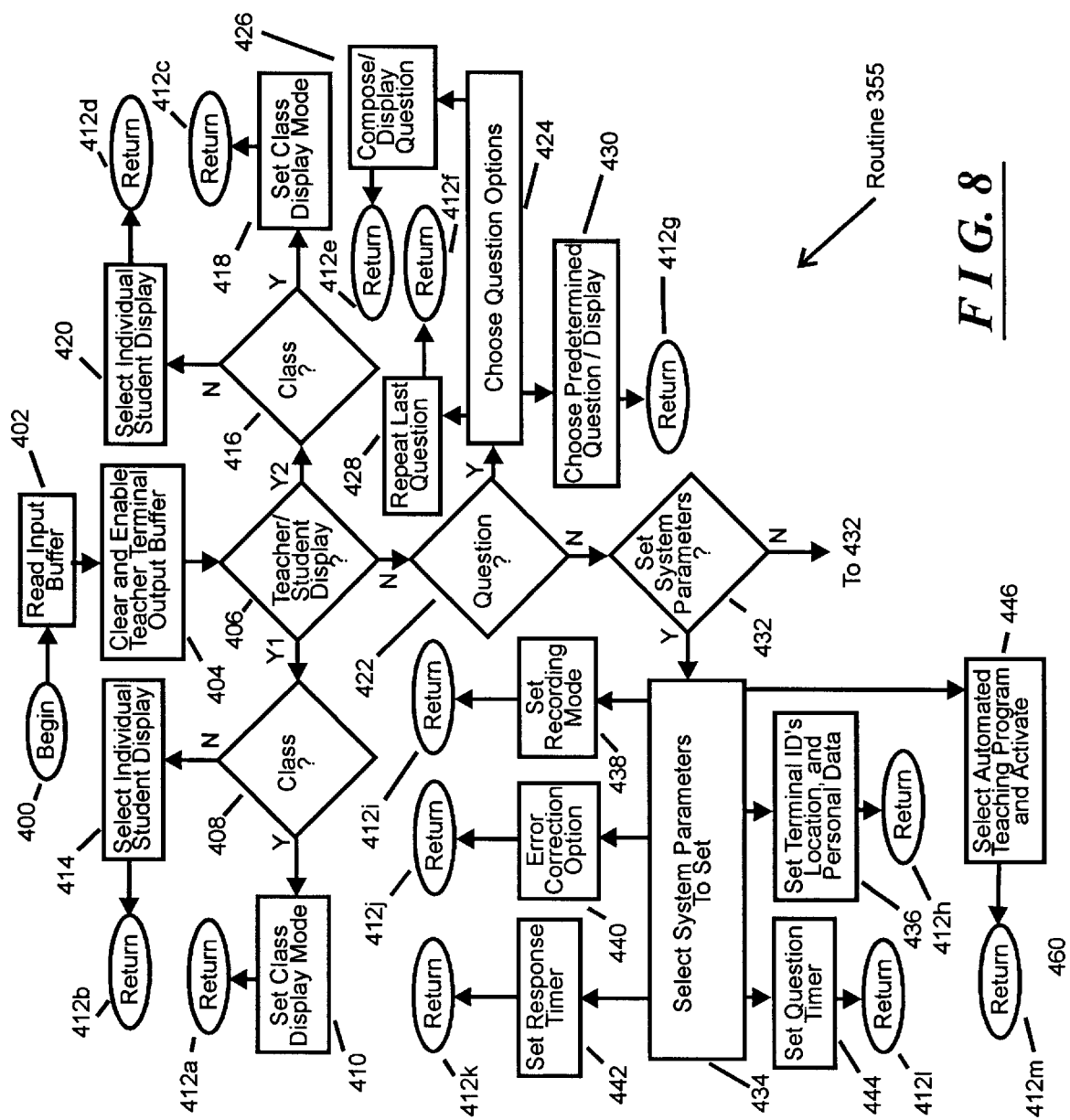
Figure 8:
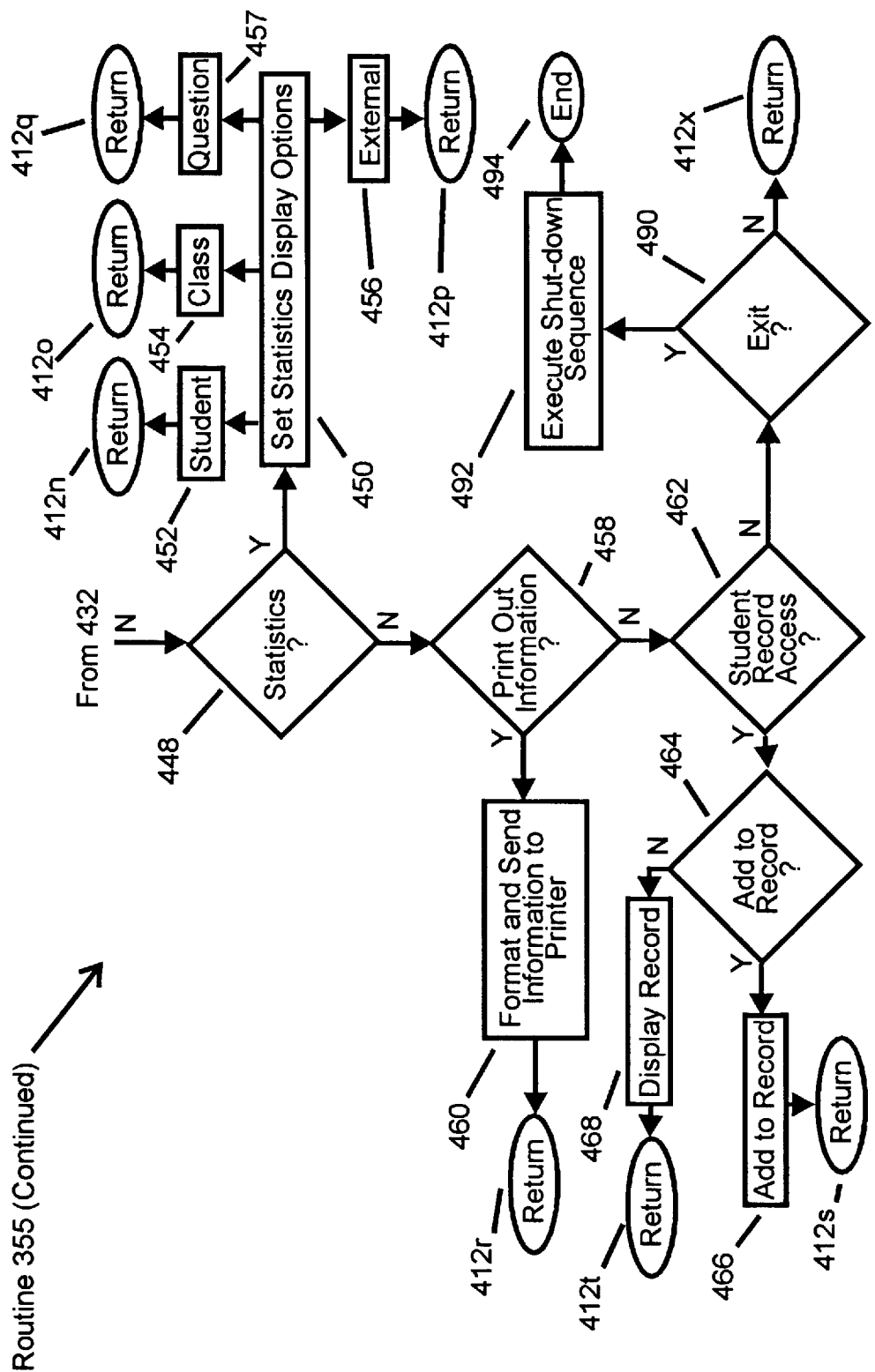

FIG. 8 illustrates a detailed flow diagram depicting the operations performed by the microprocessor 40 in connection with the instructor interrupt service routine 355. When an interrupt request from the instructor's input terminal is recognized by the interrupt controller 350 as previously described, the interrupt controller 350 enables the microprocessor 40 to return the beginning of the service routine 355 (step 400). Initially, the microprocessor 40 enables the respective instructor's terminal output buffer to be read (step 402) and thereafter the aforementioned message read indication to be sent to the instructor's input device to allow that device to clear its message buffer and generate new messages (step 404).

The operations performed by the microprocessor 40 following step 404 depend on the information contained in the message received from the instructor's input device, as described in connection with steps 406, 422, 432, 448, 458 and 462 as described below. In step 406, the microprocessor 40 determines whether the message contains a request to change the display organization of the instructional system 10. If so, the microprocessor 40 proceeds along branch Y1 if the message relates to the class display 14 or to the display 16(s) of the student's station 12(s) for one or more students, and along branch Y2 if the message relates to the instructor's display 44. If the message contains a request to update or otherwise change the information displayed on the class display 14 or a display 16(s), the microprocessor 40 proceeds to step 408 to determine whether the change request is directed to the class display 14 or display 16(s). If the microprocessor 40 determines that the change request is directed to change of the class display 14, the microprocessor 40 sequences to step 410 to execute the display request, after which the microprocessor 40 returns to interrupt controller 350 (step 412a). In response to a display request, the microprocessor may control the class display 14 to display updated information defining questions or comments the instructor may wish to make known to the entire class simultaneously, such as may otherwise be done by using, for example, a conventional blackboard. In addition, in response to a display request, the microprocessor 40 may enable the class display to display graphics or supplemental video information to enhance teaching effectiveness. Furthermore, display requests may enable the microprocessor 40 to change the format and organization of the displayed information.

Returning to step 408, if the microprocessor 40 determines in that step that the display message relates to one or more displays 16(s) of respective student's input devices 13(s), it will sequence to step 414, at which it modifies the contents or format of the respective displays 16(s) in the same manner as described above in connection with step 410, after which control is returned to the interrupt controller 350 (step 412(b)).

Returning to step 406, if the microprocessor 40 determines in that step that the display request pertains to the instructor's display (which may be either or both display 44 or the display of an input device which is similar to the student's input device 13(s)), the microprocessor 40 sequences to step 416. In that step, the microprocessor determines whether the message pertains to the display's format of class information. In response to a positive determination in step 416, the microprocessor 40 sequences to 418, in which it modifies the class information displayed as required. Modifications may include, for example, the format of information on the display, selected student or class identification information, the size and location of particular types of information on the display, statistical information which is to continuously appear on the display, etc. Thereafter, the microprocessor 40 returns control to the interrupt controller 350 (step 412c).

Returning to step 416, if the microprocessor 40 determines in that step that the message pertains to the display of information relating to one or more selected students, it sequences from step 416 to step 420. In step 420, the microprocessor 40 modifies student information of the selected student(s) as required. Following step 420, the microprocessor 40 returns to the interrupt controller 350 (step 412d).

Returning to step 406, if the microprocessor determines in that step that the message is not directed to the change of a display, it sequences from step 406 to step 422. In that step, the microprocessor 40 determines whether the message pertains to questions posed to the students by the instructor. If so, the microprocessor 40 sequences from step 422 to step 424, in which the microprocessor's operations depend on the requirements of the particular message. If the microprocessor 40 determines in step 424 that the message is directed to a newly-composed question, it sequences to step 426 where the new question is displayed to the class and/or entered into memory for later retrieval. The microprocessor 40 thereafter returns to the interrupt controller 350 (step 412e).

On the other hand, if the microprocessor 40 determines in step 424 that the message requires a repeat of a previous question, it sequences from step 424 to step 428. In step 428, the microprocessor 40 causes the last question to be re-displayed. The instructor may enable this to occur if, for example, the question appears for a set time, and the class was unable to respond adequately in the allotted time. Thereafter, the microprocessor 40 returns to the interrupt controller 350 (step 412*f*).

Returning to step 424, if the microprocessor 40 determines in that step that message pertains to re-display of a predetermined question contained, for example, in an archive or database which may be maintained in the memory 41, it sequences from step 424 to step 430. In step 430, the microprocessor 40 enables the question to be retrieved from the database, and displayed on the class display 14 or student display 16(*d*) as needed. The microprocessor 40 thereafter returns to the interrupt controller 350 (step 412*g*).

Returning to step 422, if the microprocessor 40 determines in that step that the message does not pertain to a question, it sequences to step 432. In step 432, the microprocessor 40 determines whether the message pertains to the setting of one or more of a plurality of parameters governing operations of the system 10. If the microprocessor 40 makes a positive determination in step 432, it sequences to step 434 to determine the particular parameter to be set. If the microprocessor 40 determines in step 434 that the message pertains to setting the identification information on particular students' input devices 13(*s*), it sequences to step 436, in which it causes information to be stored in memory and/or entered into the student or instructor files as needed. Following step 436, the microprocessor 40 returns to the interrupt controller 350 (step 412*h*).

Returning to step 434, if the microprocessor 40 determines in that step that the message pertains to the storage of questions and responses in a student, class, or other database or archive, it sequences to step 438. In step 438, the microprocessor 40 sets a recording mode parameter to enable recording. Thereafter, the microprocessor 40 returns (step 412*i*) to the interrupt controller 350.

Returning to step 434, if the microprocessor 40 determines that the message pertains to the operations for the correction of student answers, such as the number of times a particular student may attempt to answer a particular question, it sequences to step 440. In step 440, the microprocessor 40 sets the student error correction parameters for particular student(s) or globally for all students. Thereafter, the microprocessor 40 returns to the interrupt controller 350 (step 412*j*).

Returning to step 434, if the microprocessor 40 determines in that step that the message pertains to setting response timer parameters, it sequences to step 442, in which a response timer (not shown) is set to control, for example, the allowed time for particular student(s) or all students to respond to particular question(s) or all questions. Thereafter, the microprocessor 40 returns to the interrupt controller 350 (step 412*k*).

Returning to step 434, if the microprocessor 40 determines in that step that the message pertains to the automatic timing of prerecorded questions posed to the class, it sequences to step 444, in which it conditions a question timer (not shown). Thereafter, the microprocessor 40 returns to the interrupt controller 350 (step 412*l*).

Returning to step 434, if the microprocessor 40 determines in that step that the message pertains to the selection of automated instructional programs, it sequences to step 446, in which it selects a previously developed and recorded program and activates it for execution as previously outlined in connection with FIG. 6. Thereafter, the microprocessor 40 returns to the interrupt controller 350 (step 412*m*).

Returning to step 432, if the microprocessor 40 determines in that step that the message does not pertain to conditioning of system parameters, it sequences from step 432 to step 448. In step 448, the microprocessor 40 determines whether the message pertains to setting statistical display options or retrieving select statistical information by student or class. In response to a positive determination in step 448, the microprocessor 40 sequences to 450, in which the sequence branches based on particular type(s) of statistical information to which the message pertains. If the microprocessor 40 determines that the message relates to statistical information pertaining to one or more particular students, it sequences to step 452 in which it retrieves the required statistical information and displays it on display 44 for the instructor or display(s) 16(*s*) for the particular student(s). Thereafter, the microprocessor 40 returns to the interrupt controller 350 (step 412*n*).

Returning to step 450, if the microprocessor 40 determines in that step that the requested statistical information pertains to an entire class, it sequences to step 454, it sequences to step 454 in which it retrieves the required statistical information and displays it on display 44 for the instructor or display(s) 16(*s*) for particular student(s). Thereafter, the microprocessor 40 returns to the interrupt controller 350 (step 412*o*).

Returning to step 450, if the microprocessor 40 determines in that step that the requested statistical information pertains to archival information for another (possibly prior) class, it sequences to step 456, in which it retrieves the required statistical information and displays it on display 44 for the instructor or display(s) 16(*s*). Thereafter, the microprocessor 40 returns to the interrupt controller 350 (step 412*p*).

Returning to step 450, if the microprocessor 40 determines in that step that the requested statistical information pertains to a particular question or all questions, it sequences to step 457, in which it retrieves the required statistical information and displays it on display 44 for the instructor or display(s) 16(*s*) for particular student(s). Thereafter, the microprocessor 40 returns to the interrupt controller 350 (step 412*q*).

Returning to step 448, if the microprocessor 40 determines that the message did not pertain to a request for statistical information, proceeds to step 458, in which it determines whether the message relates to the generation of a hard copy of statistical or displayed information. In response to a positive determination in step 458, the microprocessor sequences to step 460, in which the requested information is processed, formatted, and transmitted to the printer 51 or other hardcopy output device. Thereafter, the microprocessor 40 returns to the interrupt controller 350 (step 412*r*).

Returning to step 448, if the microprocessor 40 determines that the message did not pertain to a providing a hardcopy, it sequences to step 462, in which it determines whether the message relates to accessing of the records of one or more student(s). In response to a positive determination in step 464, the microprocessor 40 sequences to step 464. In step 464, the microprocessor determines whether the message pertains to updating a record(s) of one or more student(s). In response to a positive determination in step 464, the microprocessor 40 sequences to step 466, in which the microprocessor 40 updates the required record(s). Thereafter, the microprocessor 40 returns to the interrupt controller 350 (step 412*s*).

Returning to step 464, if the microprocessor determines in that step that the message pertains to display of record(s) of one or more student(s), it sequences to step 468, in which the microprocessor 40 displays the required record(s) on the instructor's display 44. Thereafter, the microprocessor 40 returns to the interrupt controller 350 (step 412*t*).

Returning to step 462, if the microprocessor 40 determines that the message did not pertain to student record access, it sequences to step 490. In step 490, the microprocessor 40 determines whether the message indicates a request to end the instructional session. In response to a positive determination in step 490, the microprocessor 40 sequences to 492, in which a shut-down sequence (492) is performed. The sequence may comprise conventional shut-down procedures, including, for example, backup of the current system records and a controlled disconnection from the terminals. The latter may be important for an application where the input devices 13(*s*) are remote and attached via hard-wired links such as networks or radio connections, for example. The microprocessor 40 then terminates operations (step 494).

Returning to step 490, if the microprocessor 40 determines in that step the message did not require termination, no valid message was recognized. In that case, the microprocessor 40 returns to the interrupt controller 350 (step 412*x*)., concluding operation of the instructor service request routine 355.

Figure 9:
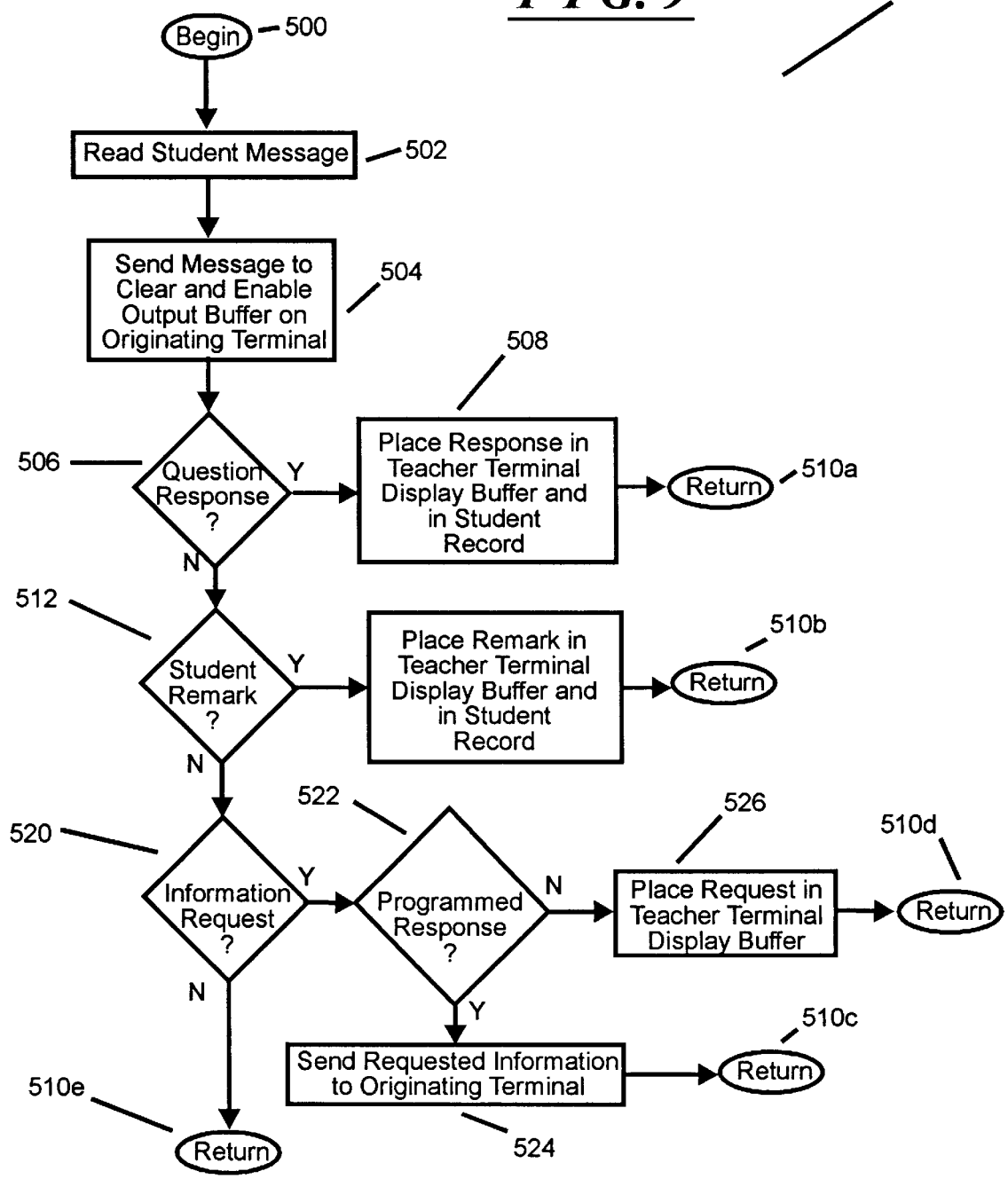

FIG. 9 illustrates the operations performed by the microprocessor 40 in connection with the student message service routine 360 (FIG. 5), which is executed in response to receipt of a message from a student's input device 13(*s*). A student's input device 13(*s*) may generate a number of types of messages, including, for example, in response to a question, a comment, or a request for information, and the like. Upon receipt of a message from a student's input device, the communication link transceiver 63 and encoder/decoder 64 load the message in the student input device's message buffer and generates an interrupt which is initially serviced by interrupt controller 350. The interrupt controller 350, in turn, enables the microprocessor 40 to process the student message service routine 360 as previously described. With reference to FIG. 9, operations for routine 360 begin at step 500 and sequence to 502 in which the microprocessor 40 retrieves the student message from the input buffer and transfers it to memory 41. The microprocessor 40 then controls the student input device's output buffer to be cleared and enabled to accept subsequent input as described in FIG. 7.

Thereafter, the microprocessor 40 sequences to step 506. In steps 506, 512 and 520, the microprocessor 40 branches based on the type of message that is received from the student's input device 13(*s*). In step 506, the microprocessor 40 determines whether the student's message was a response to a question originating from the base station 11. In response to a positive determination in step 506, the microprocessor 40 sequences to step 508, in which the student's response may be displayed on the instructor's display 44, entered into the student's or class' permanent record in memory 41, and/or used to generate statistics as described above on student or class performance and instructional efficacy, as required. Thereafter, the microprocessor 40 returns to the interrupt controller 350 (step 510*a*).

Returning to step 506, if the microprocessor determines in that step that the message was not a question response, it sequences from step 506 to step 512. In step 512, the microprocessor 40 determines whether the message was an unsolicited student remark. In response to a positive determination in step 512, the microprocessor 40 sequences to 514, in which the message is displayed on the instructor's display 44 and entered into the students record, as required. Thereafter, the microprocessor 40 returns to the interrupt controller 350 (step 510*b*).

Returning to step 512, if the microprocessor 40 determines in that step that the message was not an unsolicited student remark, it sequences from step 512 to step 520. In step 520, the microprocessor 40 determines whether the message was a request for information. In response to a positive determination in step 520, the microprocessor 40 sequences to 522, in which it determines whether the request is one for which it can provide a programmed or automated response. In response to a positive determination in step 522, the microprocessor 40 sequences to step 524, in which it retrieves the requested information and sends it to the requesting input device 13(*s*). Thereafter, the microprocessor 40 returns to the interrupt controller 350 (step 510*c*).

On the other hand, if the microprocessor 40 determines in step 522 that the message is a request for which it cannot provide a programmed response, it sequences to step 526, in which it displays the request on the instructor's display 44 for response by the instructor. Thereafter, the microprocessor 40 returns to the interrupt controller 350 (step 510*d*). The branch at step 522 may be based on a direct request from the originating student indicated in the content of the request message, or it may be accomplished based upon a decision arrived at using artificial intelligence or fuzzy logic hardware and/or software to parse and analyze the message content, thereby freeing the instructor from direct interaction for every request, so that a single instructor may effectively interact with a larger number of students than previously possible.

Returning to step 520, if the microprocessor 40 determines in that step that the message was not an information request, no valid message is recognized and it returns to the interrupt controller 350 (step 510*e*).

Figure 10:
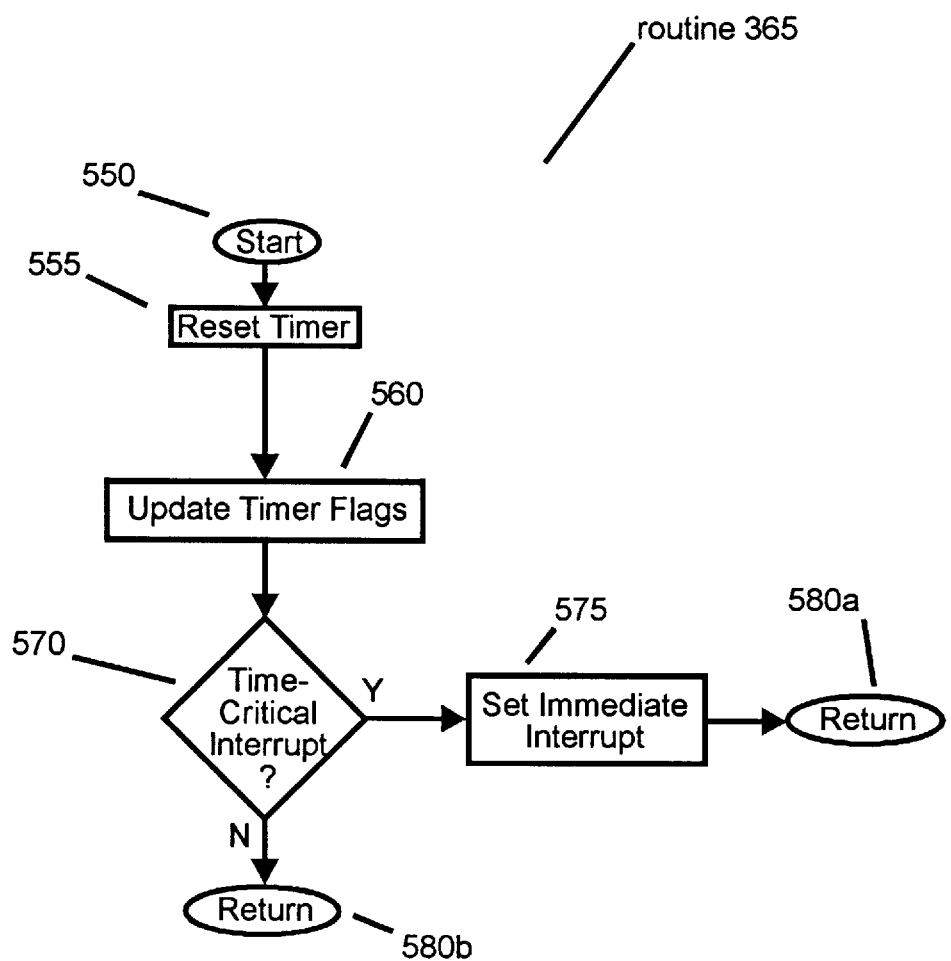

FIG. 10 depicts operations performed by the microprocessor 40 in connection with the timed response service routine 365 (FIG. 5) which is enabled by the interrupt controller 350 in response to timing out of a hardware and/or software timer. This may occur, for example, when a fixed time is allotted for students to answer a particular question or a sequence of questions. When a timer times out, an interrupt is generated which is received by the interrupt controller 350. In response, the interrupt controller enables the microprocessor 40 to begin processing the timed response service routine 565 (step 550). Initially, the microprocessor 40 resets or restarts the interrupt timer as required, as for multiple cycle operations (step 555), and thereafter updates flags indicating timer status (step 560) (such as a count of the completed timer cycles, timer reset, timer done, etc.), which flags may be asynchronously read as needed by the various routines as described above.

The microprocessor 40 then determines whether the end of a timing cycle requires a time-critical response, such as the end of a test sequence, etc. (step 570). In response to a positive response in step 570, the microprocessor 40 sequences to step 575 where the immediate program requirements are executed, such as a "pens down" command to student terminals and the voiding of all subsequent student responses. Thereafter, the microprocessor 40 returns to the interrupt controller 350 (step 580*a*).

Returning to step 570, if the microprocessor 40 determines in that step that an immediate response to timer interrupt is not required, the microprocessor 40 returns to the interrupt controller 350 (step 580*b*).

The interactive educational system 10 provides a number of important advantages over prior educational devices and/or systems. For example, the system 10 contemplates interconnecting the student stations 12(s), including the input devices 13(s) and the students' displays 16(s), and the base station 11 using, for example, radio, infrared or other non-hard-wired communication channel arrangements, which will eliminate the necessity of expensive modifications to classrooms and instructional centers which would be required if hardwired networks are employed In addition, the system 10 is relatively compact and inexpensive, being based on inexpensive microprocessors, and provides information as to the students' understanding of the material being presented by the instructor during instruction so that the instructor may tailor the presentation according to the students' understanding.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An interactive instruction system comprising an instructor's base station and a plurality of student input devices connected to said base station over respective communication links, each said student input device being for use by a student in an instruction group during an instructional session,
   A. each student input device being adapted to receive (i) query response information input by a respective student in response to a query issued during said instructional session and (ii) a response transmit enable input from the respective student, each student input device generating a response message including the information input from the student and an identifier code uniquely identifying the student input device for transmission to the base station during a said instructional session in response to said response transmit enable input; and
   B. the base station receiving the response messages from the student input device during the instructional session and generating
      i. class response statistics from the responses as contained in the messages, and
      ii. individual response statistics for an individual student from the responses and as contained in the messages and the identifier codes as contained in the messages,
   as selected by the instructor.

2. An interactive instruction system as defined in claim 1 in which said student input device includes a student information input keypad for receiving information input from a student, the student input device being operable to generate a response message representing the information in response to the query response information input when said student provides said response transmit enable input.

3. An interactive instruction system as defined in claim 2 in which the student information input keypad comprises an alphabetic keypad for receiving information comprising at least one alphabetic character and a control keypad portion for enabling said student to provide said response transmit enable input.

4. An interactive instruction system as defined in claim 2 in which the student information input keypad comprises a numeric keypad for receiving numeric information and a control keypad for enabling said student to provide said response transmit enable input.

5. An interactive instruction system as defined in claim 4 in which the student information input keypad further comprises an alphabetic keypad for receiving information comprising one or more alphabetic characters.

6. An interactive instruction system as defined in claim 2 in which ones of said queries allow a student to select among a number of possible responses, the student information input keypad including a plurality of keys each corresponding to one of said possible responses and a control keypad portion for enabling said student to provide said response transmit enable input.

7. An interactive instruction system as defined in claim 6 in which ones of said queries allow a student to select among two responses, the student information input keypad including two keys each corresponding to one of said possible responses.

8. An interactive instruction system as defined in claim 2 in which the base station includes:
   A. a response message processor for receiving response messages from student input devices of students of said instructional group, determining their correctness, and generating in response correctness information; and
   B. a statistics generator for generating response statistics as selected by the instructor in response to the correctness information.

9. An interactive instruction system as defined in claim 8 in which said base station includes an instructor's display for displaying the response statistics generated by the statistics generator.

10. An interactive instruction system as defined in claim 9 in which statistics generator is operable to generate a number of types of response statistics, the instructor's display displaying a selected type of response statistics as selected by the instructor.

11. An interactive instruction system as defined in claim 1 in which said student input device includes a microphone for receiving audible input from a student, the student input device being operable to generate an audible response message including the audible response in response to the input when the respective student provides said response transmit enable input.

12. An interactive instruction system as defined in claim 11 in which the base station includes:
   A. a response message processor for receiving audible response messages from student input devices of students of said instructional group, performing a voice recognition operation in connection therewith to generate their textual information content, determining the correctness of the textual information content and generating in response correctness information; and
   B. a statistics generator for generating response statistics as selected by the instructor in response to the correctness information.

13. An interactive instruction system as defined in claim 12 in which said base station includes an instructor's display for displaying the response statistics generated by the statistics generator.

14. An interactive instruction system as defined in claim 13 in which said statistics generator generates a number of types of response statistics, the instructor's display displaying a selected type of response statistics as selected by the instructor.

15. An interactive instruction system as defined in claim 1 in which said student input device includes a microphone for receiving audible input from a student, the student input device performing a speech recognition operation in connection therewith to generate textual information content in response to the audible input, the student input device generating the response message including the textual information content for transmission to the base station when the respective student provides said response transmit enable input.

16. An interactive instruction system as defined in claim 1 in which the student input device further includes a student display device for displaying information to the student.

17. An interactive instruction system as defined in claim 16 in which the base station generates information to be displayed by the student display device, the base station transmitting the information to be displayed to the student input devices, each student input device further including an information receiver for receiving the information from the base station and displaying the received information on the associated student display device.

18. An interactive instruction system as defined in claim 16 in which the student selects information to be displayed using the student input device.

19. An interactive instruction system as defined in claim 1 in which each student is further provided with a student display for displaying selected information to the student as selected by the base station.

20. An interactive instruction system as defined in claim 19 in which the student display is further provided with a student input arrangement for allowing a student to input information using the student display, each student's student input device being operable to generate a message in response to the information input using the student display.

21. An interactive instruction system as defined in claim 20 in which the student input arrangement comprises a touch-screen input arrangement.

22. An interactive instruction system as defined in claim 20 in which the student input arrangement comprises a light pen.

23. An interactive instruction system as defined in claim 20 in which the student input arrangement comprises a mouse for manipulating a mouse pointer.

24. An interactive instruction system as defined in claim 1 in which the base station includes:
   A. a response message processor for receiving messages from student input devices of students of said instructional group, determining their correctness and generating in response correctness information; and
   B. a statistics generator for generating response statistics as selected by the instructor in response to the correctness information.

25. An interactive instruction system as defined in claim 24 in which the base station further includes an instructor input device for receiving control information from an instructor to control queries provided to the students.

26. An interactive instruction system as defined in claim 24 in which the base station further includes an instructor display for displaying information to the instructor.

27. An interactive instruction system as defined in claim 26 in which the instructor display selectively displays class response statistics and individual response statistics as selected by the instructor.

28. An interactive instruction system as defined in claim 27 in which the instructor display selectively displays information relating to queries as selected by the instructor.

29. An interactive instruction system as defined in claim 24 in which the base station further includes a class display for displaying information to the instructional group.

30. An interactive instruction system as defined in claim 29 in which the class display displays queries to the instructional group.

31. An interactive instruction system as defined in claim 29 in which the class display displays instructional information to the instructional group.

32. An interactive instruction system as defined in claim 29 the information displayable by said class display being associated with a plurality of display information types, the class display displaying one of said display information types for display as selected by the instructor.

33. An interactive instruction system as defined in claim 1 in which the student input devices transfer messages to the base station over a communication link.

34. An interactive instruction system as defined in claim 33 in which the communication link comprises a hardwired network.

35. An interactive instruction system as defined in claim 33 in which the communication link comprises an optical fiber.

36. An interactive instruction system as defined in claim 33 in which the communication link comprises a radio link.

37. An interactive instruction system as defined in claim 33 in which the communication link comprises an infrared link.

38. An interactive instruction system as defined in claim 33 in which each student input device transmits a message to the base station in response to a signal from the base station enabling said student input device to transmit the message.

39. An interactive instruction system as defined in claim 33 in which the base station transmits a transmission enabling signal to the student input devices, the student input devices transmitting messages after a selected delay period, which delay period differs as among said student input devices.

40. An interactive instruction system as defined in claim 39 in which the student input devices determine their respective delay periods from their respective identifier codes.

41. An interactive method using an instructor's base station and at least one student input device for use by a student to effect interactive instruction during an instructional session, the student input device being connected to said base station over a respective communication link, the communication link transferring information between said student input device and said base station, the method comprising the steps of:
   A. enabling the student input device to receive (i) query response information input by a respective student in response to a query during a said instructional session and (ii) a response transmit enable input from the respective student, each student input device generating a response message including the information input from the student and an identifier code uniquely identifying the student input device for transmission to the base station during a said instructional session in response to said response transmit enable input; and
   B. enabling the base station to receive the messages from the student input device during a said instructional session and generating
      i. code signals defining class response statistics from the responses as contained in the messages, and
      ii. code signals defining individual response statistics for an individual student from the responses and as contained in the messages and the identifier codes as contained in the messages,
   as selected by the instructor.

* * * * *